United States Patent
Shin et al.

(10) Patent No.: US 12,538,106 B2
(45) Date of Patent: Jan. 27, 2026

(54) METHOD AND APPARATUS FOR OPERATING USER EQUIPMENT SUPPORTING SOFT VEHICLE TO EVERYTHING RELATED TO BLUETOOTH LOW ENERGY

(71) Applicant: LG ELECTRONICS INC., Seoul (KR)

(72) Inventors: Dongsoo Shin, Seoul (KR); Hakseong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 409 days.

(21) Appl. No.: 18/203,325

(22) Filed: May 30, 2023

(65) Prior Publication Data

US 2024/0406691 A1    Dec. 5, 2024

(51) Int. Cl.
*H04W 4/40* (2018.01)
*H04W 4/06* (2009.01)
*H04W 4/80* (2018.01)

(52) U.S. Cl.
CPC .............. *H04W 4/40* (2018.02); *H04W 4/06* (2013.01); *H04W 4/80* (2018.02)

(58) Field of Classification Search
CPC ............ H04W 4/40; H04W 4/80; H04W 4/06
USPC ........................................................ 455/3.06
See application file for complete search history.

(56) References Cited

U.S. PATENT DOCUMENTS

| | | | |
|---|---|---|---|
| 2017/0094033 A1* | 3/2017 | Sathyadevan | H04L 69/03 |
| 2020/0280842 A1* | 9/2020 | Liu | H04L 9/3268 |
| 2020/0344576 A1* | 10/2020 | Li | H04W 4/06 |
| 2020/0389469 A1* | 12/2020 | Litichever | H04W 12/12 |

(Continued)

FOREIGN PATENT DOCUMENTS

KR    10-2022-0131275 A    9/2022

OTHER PUBLICATIONS

"What is BLE MQTT Gateway and BLE2mqtt in IoT," Dusun, May 4, 2023, 14 pages total.

(Continued)

*Primary Examiner* — April G Gonzales
(74) *Attorney, Agent, or Firm* — Birch, Stewart, Kolasch & Birch, LLP

(57) ABSTRACT

A user equipment (UE) including a receiver configured to receive a message corresponding to a Soft Vehicle to Everything (V2X) message transmitted by a Message Queuing Telemetry Transport (MQTT) server using MQTT communication or a Soft V2X Bluetooth Low Energy (BLE)-related broadcast message transmitted by another UE using BLE communication; and a controller including a message broker configured to determine whether the received message is the Soft V2X BLE-related broadcast message or the Soft V2X message transmitted by the MQTT server based on identification information included in a payload of the received message, in response to the received message being determined as the Soft V2X BLE-related broadcast message, perform filtering on the received message based on a comparison between an operation mode of the UE and an operation mode of the other UE, and in response to the received message being determined as the Soft V2X message transmitted by the MQTT server, process the received message without the filtering.

20 Claims, 15 Drawing Sheets

(56) References Cited

U.S. PATENT DOCUMENTS

| | | | | |
|---|---|---|---|---|
| 2022/0007145 A1* | 1/2022 | El Essaili | ............. | H04W 4/029 |
| 2022/0046391 A1* | 2/2022 | Ong | ......................... | H04W 4/08 |
| 2022/0116334 A1* | 4/2022 | Zhu | ....................... | H04L 49/901 |
| 2022/0345860 A1* | 10/2022 | Oh | ........................... | H04L 67/12 |
| 2022/0394516 A1* | 12/2022 | Shire | ....................... | H04W 4/80 |
| 2022/0408219 A1* | 12/2022 | Kong | ..................... | H04W 4/023 |
| 2023/0156440 A1* | 5/2023 | Kong | ...................... | H04W 4/40 |
| | | | | 455/414.1 |
| 2023/0292243 A1* | 9/2023 | Mueck | .............. | H04W 52/0216 |
| 2023/0336566 A1* | 10/2023 | Odabaee | ............... | H04L 63/168 |
| 2024/0109541 A1* | 4/2024 | Ucar | .................... | G08G 1/0112 |
| 2024/0195867 A1* | 6/2024 | Bapst | ................... | H04L 41/5009 |
| 2024/0284147 A1* | 8/2024 | Song | ....................... | H04L 67/55 |
| 2024/0284150 A1* | 8/2024 | Song | ....................... | H04W 4/40 |

OTHER PUBLICATIONS

Poellabauer et al., "Using Bluetooth Low Energy for Dynamic Information-Sharing in Vehicle-to-Vehicle Communication," SAE International Journal of Passenger Cars—Electronic and Electrical Systems, Mar. 2017, 10 pages total.

Skerrett, "Accelerating Vehicle-2-Everything (V2X) Services with a Modern Data Foundation," HiveMQ, Jun. 15, 2021, 11 pages total.

\* cited by examiner

: First subscription area

: Second subscription area

FIG. 8

| Application |  |
|---|---|
| Classification |  |
| Message |  |
| Message Broker |  |
| MQTT |  |
| TLS1.2 | D2D protocol |
| TCP/IP |  |
| Cellular modem | BLE |

(a)

(b)

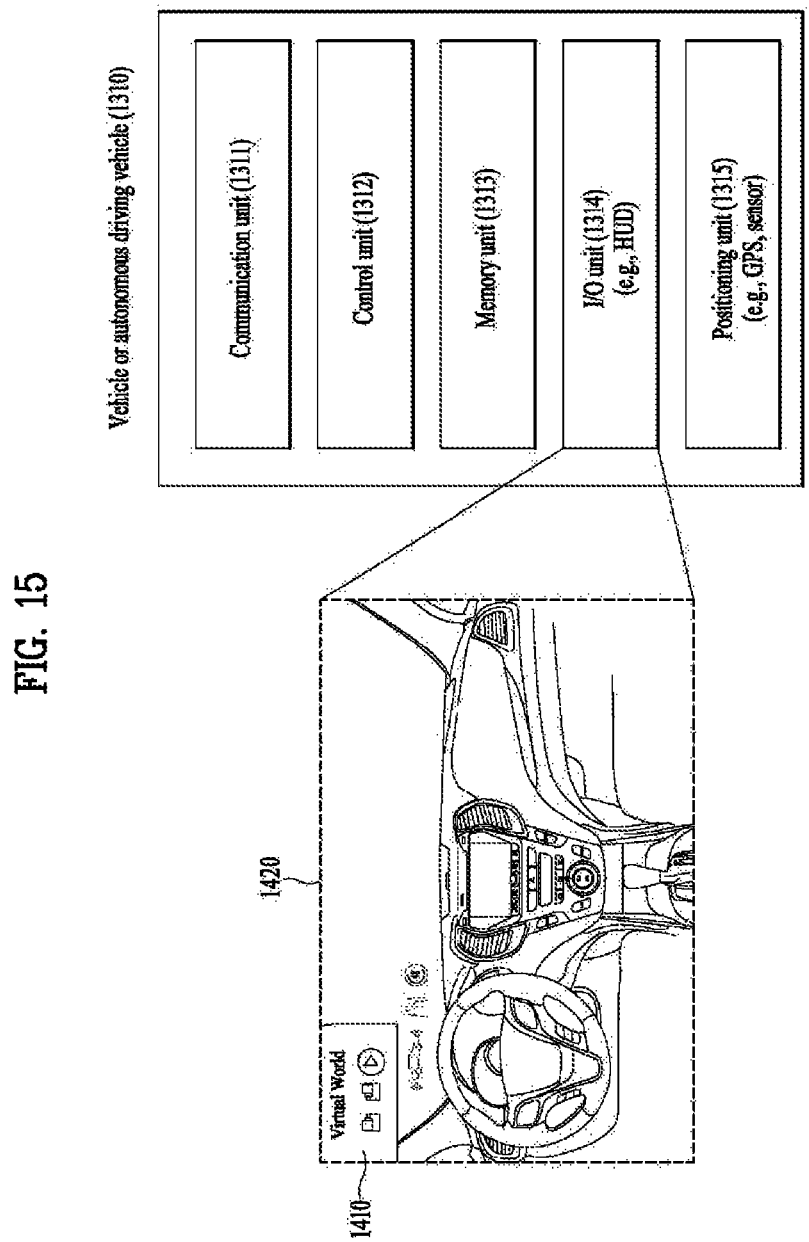

METHOD AND APPARATUS FOR OPERATING USER EQUIPMENT SUPPORTING SOFT VEHICLE TO EVERYTHING RELATED TO BLUETOOTH LOW ENERGY

BACKGROUND

Technical Field

The present disclosure relates to a wireless communication system and more particularly to a method and apparatus for operating a user equipment (UE) supporting Soft Vehicle to Everything (V2X) related to Bluetooth Low Energy (BLE).

Discussion of the Related Art

Wireless communication systems provide various types of communication services such as voice and data. In general, a wireless communication system is a multiple access system capable of supporting communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

Sidelink (SL) refers to a communication scheme in which a direct link is established between user equipments (UEs) and the UEs directly exchange voice or data without intervention of a base station (BS). SL is considered as a solution of relieving the BS of the constraint of rapidly growing data traffic.

Vehicle-to-everything (V2X) is a communication technology in which a vehicle exchanges information with another vehicle, a pedestrian, and infrastructure by wired/wireless communication. V2X can be categorized into four types: vehicle-to-vehicle (V2V), vehicle-to-infrastructure (V2I), vehicle-to-network (V2N), and vehicle-to-pedestrian (V2P). V2X communication can be provided via a PC5 interface and/or a Uu interface.

As more and more communication devices demand larger communication capacities, there is a need for an enhanced mobile broadband communication relative to existing Radio Access Technologies (RATs). Accordingly, a communication system is under discussion, for which services or UEs sensitive to reliability and latency are considered. The next-generation RAT in which eMBB, MTC, and URLLC are considered is referred to as new RAT or NR. In NR, V2X communication is also supported.

SUMMARY

Accordingly, the present disclosure is directed to a method and apparatus for operating a user equipment (UE) supporting Soft Vehicle to Everything (V2X) related to Bluetooth low energy (BLE) that substantially obviate one or more problems due to limitations and disadvantages of the related art.

One object of the present disclosure is to provide a method and apparatus for selectively using BLE as a message transmission and reception scheme in Soft V2X.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, there is provided a UE configured to support Soft V2X related to BLE in a wireless communication system. The UE can include a receiver configured to receive either a message transmitted by a Message Queuing Telemetry Transport (MQTT) server or a BLE-related broadcast message; and a controller including a message broker configured to determine one transmission and reception scheme among a transmission and reception scheme based on the MQTT server and a BLE-based transmission and reception scheme. The message broker can be configured to perform filtering on a broadcast message based on comparison between an operation mode of the UE and an operation mode of a UE transmitting the broadcast message.

In another aspect of the present disclosure, there is provided a method of operating a UE supporting Soft V2X related to BLE in a wireless communication system. The method can include receiving either a message transmitted by an MQTT server or a BLE-related broadcast message; and determining, by a message broker, one transmission and reception scheme among a transmission and reception scheme based on the MQTT server and a BLE-based transmission and reception scheme. The message broker can be configured to perform filtering on a broadcast message based on comparison between an operation mode of the UE and an operation mode of a UE transmitting the broadcast message.

When the operation mode of the UE transmitting the broadcast message becomes a hazard to the operation mode of the UE, the broadcast message is delivered to a message layer. The operation mode or operational type can be any one of a pedestrian, a vehicle, and a personal mobility vehicle (PMV). The UE can be configured to identify that the broadcast message is the BLE-related broadcast message for Soft V2X through a universally unique identifier (UUID) included in an AdvData field included in a payload of the broadcast message. The UUID can be preconfigured only for Soft V2X.

When the broadcast message is identified as the BLE-related broadcast message for Soft V2X through the UUID, the message can be parsed and then delivered to the message broker. The AdvData field can further include the operation mode of the UE and a personal safety message/basic safety message (PSM/BSM). The message broker can be configured to determine the transmission and reception scheme based on a user input.

The user input can be a user input for a message transmission and reception scheme in a Soft V2X application. The message broker can be configured to determine the transmission and reception scheme based on a remaining battery capacity. When the remaining battery capacity is less than or equal to a predetermined threshold, the message broker can be configured to determine the transmission and reception scheme as the BLE-based transmission and reception scheme.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIGS. 6 to 11 are diagrams for explaining embodiment(s); and

FIGS. 12 to 15 are diagrams illustrating various devices to which the embodiment(s) are applicable.

DETAILED DESCRIPTION

Reference will now be made in detail to the preferred embodiments of the present disclosure, examples of which are illustrated in the accompanying drawings. Wherever possible, the same reference numbers will be used throughout the drawings to refer to the same or like parts.

In various embodiments of the present disclosure, "/" and "," should be interpreted as "and/or." For example, "A/B" can mean "A and/or B." Further, "A, B" can mean "A and/or B." Further, "A/B/C" can mean "at least one of A, B and/or C." Further, "A, B, C" can mean "at least one of A, B and/or C." In various embodiments of the present disclosure, "or" should be interpreted as "and/or." For example, "A or B" can include "only A", "only B", and/or "both A and B." In other words, "or" should be interpreted as "additionally or alternatively."

Figure 1:
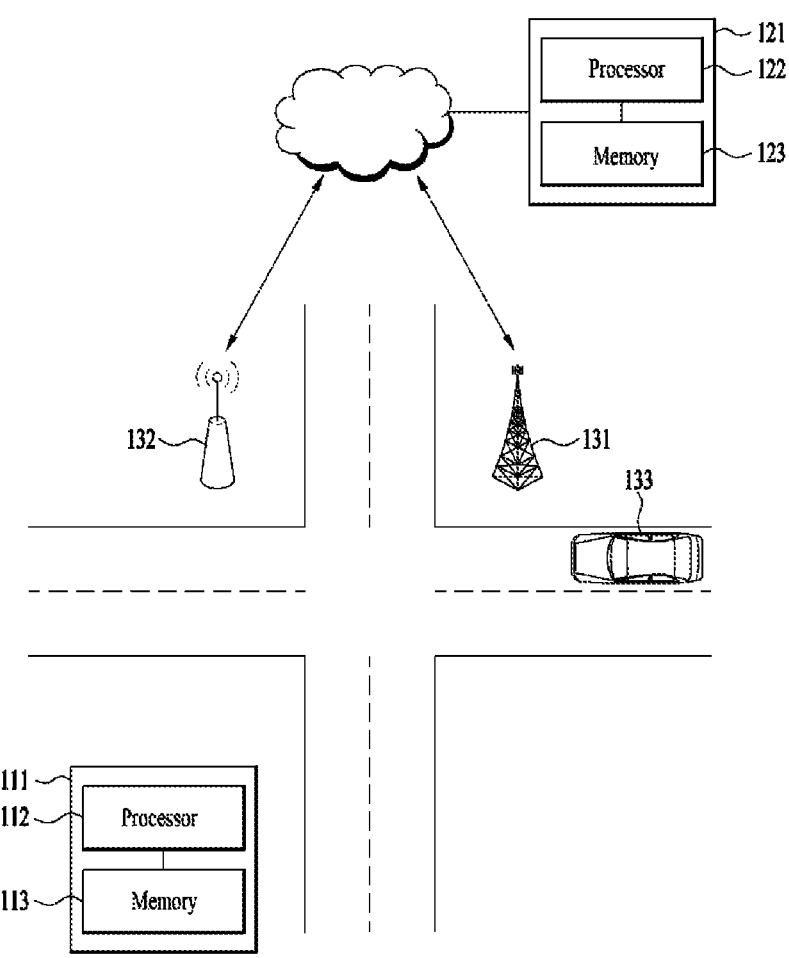
FIG. 1 is a diagram illustrating a system to which the present disclosure is applied.

FIG. 1 is a diagram showing a system having the present disclosure applied thereto. The system includes a UE 111 (or a V2X equipment/device) and a server 121 (or a V2X server). The UE 111 can communicate with the server 121 through a base station 131 or a Road Side Unit (RSU) 132. The UE 111 can communicate with the base station 131, the Road Side Unit (RSU) 132, a neighbor vehicle 133, and/or a neighbor UE using a wireless communication protocol. There is no limit to wireless communication protocols, including, for example, Dedicated Short Range Communications (DSRC), Cellular-V2X (C-V2X), WiFi, Bluetooth, and/or 3$^{rd}$ Generation Partnership Project (3GPP) based Cellular Communication Protocol (e.g., Wideband Code Division Multiple Access (WCDMA), Long Term Evolution (LTE), New Radio (NR), etc.).

The server 121 receives one or more V2X messages from the UE 111 in a managed area. The server 121 can forward the one or more collected V2X messages to a UE currently subscribing. The V2X message is periodically or aperiodically transmitted by the UE 111 (or RSU 132) to the server 121 and provides state information of the UE 111 (or a device managed by the RSU 132). For example, the UE 111 can transmit 10 V2X messages per second. The server 121 collects V2X messages from a multitude of UEs and forwards the V2X messages to the subscribing UE.

The following table shows an example of information elements included in the V2X message. Not all information elements are essential, and the name is just an example. Information elements can be added/changed/deleted depending on the policy or situation.

TABLE 1

| Name | Description |
|---|---|
| V2X ID | Temporary Identifier (ID) for identifying UE that transmits this message. This can be randomly selected by UE and periodically changed. The size can be 4 octets. |
| Position | Indicates the location of UE. This can include Latitude, Longitude, and Elevation. |
| (Positional Accuracy | Includes quality of various parameters used to model the accuracy of positioning. |
| Velocity | Indicates the speed of UE. |
| Heading | Indicates the current heading (direction of motion) of UE. |
| Path History | Defines a geometric path reflecting UE's movement over some period of time and/or distance |
| Acceleration | Indicates acceleration of UE. This can include a set of acceleration values for three orthogonal directions of UE: longitude axis, lateral axis, and vertical axis. |
| Device type | Indicates the type of UE. Examples: Pedestrians, vehicles, bicycles, etc. |
| Publishing area | Area where the UE sends V2X messages to the server. Publishing area includes one or more tiles at each level. |

A V2X message transmitted by the UE 111 to the server 121 is referred to as an Uplink (UL) V2X message, and a V2X message transmitted by the server 121 to the UE 111 is referred to as a Downlink (DL) V2X message. The UE 111 can include a processor 112 and a memory 113. The processor 112 implements the function of the UE 111 and can include one or more software modules. The UE 111 can further include various additional devices according to functions such as a display, a user interface, a wireless modem, etc.

The server 121 includes computing hardware connected to the one or more base stations 131 and/or the RSU 132 to provide V2X functions and services to UE 111. The server 121 can be a Mobile/multi-access Edge Computing (MEC)-based server or a centralized server. The server 121 can be referred to as another name such as a geocast server, a soft server, etc. The server 121 can include a processor 122 and a memory 123. The processor 122 implements a function of the server 121 and can include one or more software modules.

The processor 112/122 can include Application-Specific Integrated Circuit (ASIC), Central Processing Unit (CPU), Application Processor (AP), Digital Signal Processors (DSPs), Digital Signal Processing Devices (DSPDs), Programmable Logic Devices (PLDs), Field Programmable Gate Arrays (FPGAs), microcontroller, chipset, logic circuit, data processor, and/or combinations thereof. In a software implementation for the following embodiments, software codes for performing the functions described herein can be stored in the memory 113/123 and processed by the processor 112/122.

The memory 113/123 can store information accessible by the processor 112/122. The information can include instructions executable by the processor 112/122 and/or data processed by the processor. The memory 113/123 can include any form of computer-readable medium configured to store information. For example, the memory 113/123 can include Read Only Memory (ROM), Random Access Memory (RAM), Digital Video Disc (DVD), optical disc, flash memory, Solid State Drive (SSD), hard drive, and combinations thereof.

Message Queuing Telemetry Transport (MQTT) is used as a message protocol between the UE 111 and the server 121, but this is only an example. Advanced Message Queuing Protocol (AMQP), Hypertext Transfer Protocol (HTTP), and/or vendor specific protocols can be used.

Now, the setting of an area for a V2X service will be described in more detail. Hereinafter, a tile refers to a geographical basic unit for setting a subscription area. Hereinafter, a quadrangle is shown as a tile shape, which is just exemplary. There are no restrictions on the shapes of tiles such as polygons, circles, etc.

Figure 2:
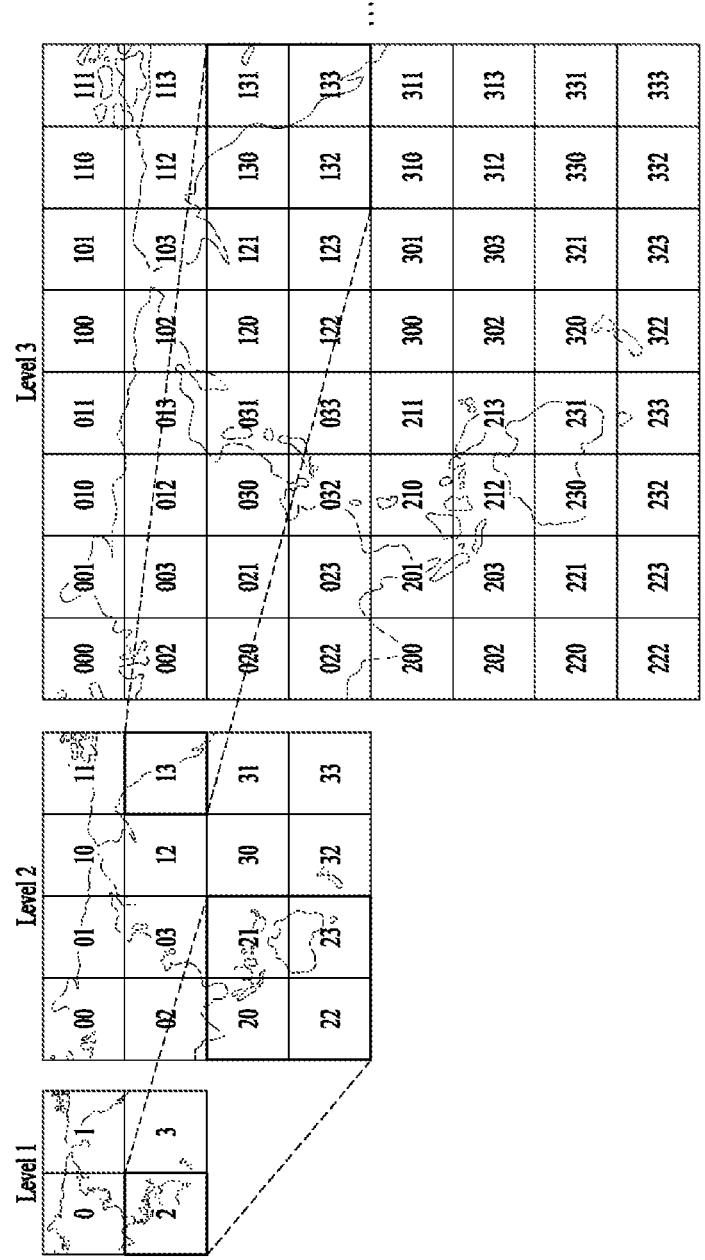
FIG. 2 is a diagram illustrating an example of a tile based on a quadtree.

FIG. 2 is a diagram showing an example of a quadtree used tile. The quadtree represents a partition of space in two dimensions by decomposing a map (i.e. world map) into four equal quadrants, subquadrants, and so on. A size of the quadrant varies according to a zoom level, and each quadrant corresponds to a tile. Here, the cases where the levels are 1, 2, and 3 are shown. The larger the level, the smaller the size of the tile. At each level, a unique identifier is assigned to a tile. A tile ID can have the bit number corresponding to a level.

A UE can obtain an ID of a tile in which the UE is located based on its location information (e.g., latitude and longitude). The UE and/or server can adjust a size of an area by adjusting a level according to a situation.

In the following embodiment, areas for a V2X service are as follows.

Management area: An area managed by a server when one or more servers distributively manage an area to serve large-scale users or a large area. The management area includes one or more tiles.

Subscription area: An area where a UE has subscribed to a server. The subscription area can be referred to by other names such as a concerned area, an impact area, a geocast area, etc. The subscription area includes one or more tiles. The subscription area can be included in one management area, or can be defined over a plurality of management areas by a plurality of servers.

Publishing area: An area where a UE transmits a V2X message to a server. The publishing area can include one or more tiles at each level. The publishing area can indicate a tile in which the UE is currently located. A part or all of the publishing area can overlap the subscription area.

Figure 3:
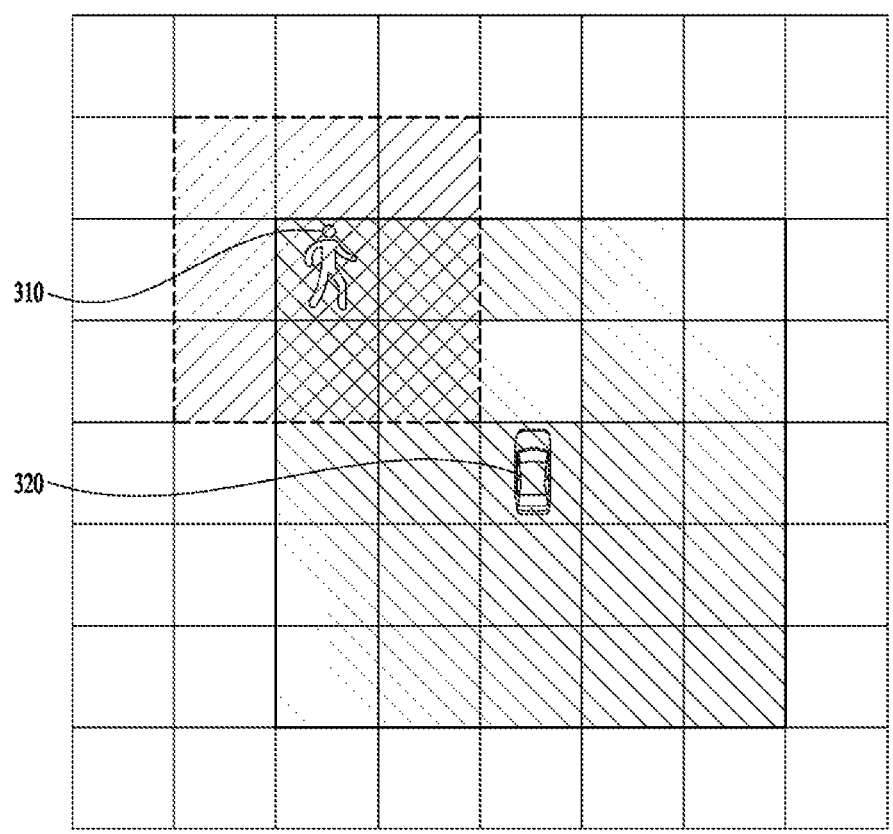
FIG. 3 is a diagram illustrating an example of configuring a subscription area.
Figure 3:
Figure 3:
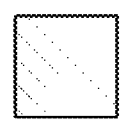

Next, FIG. 3 shows one example of setting a subscription area. A first subscription area is set for a first UE 310, and a second subscription area is set for a second UE 320. Each of the UEs can periodically or aperiodically set/change/delete the subscription area (e.g., when its location is changed). Each of the UEs can also request the server to set/change/delete the subscription area.

The number of tiles included in the first subscription area is 9, and the number of tiles included in the second subscription area is 25, but there is no limit to the number of tiles included in the subscription area or the shape of the subscription area. The subscription area can include a tile in which the UE is located. Alternatively, the subscription area can include one or more tiles except for the tiles in which the UE is located.

The first UE 310 can generate a first V2X message and periodically transmit the first V2X message to a server. The second UE 320 can generate a second V2X message and periodically transmit the second V2X message to the server.

The server can forward one or more V2X messages received in or around the subscription area to a UE associated with the subscription area.

A device for setting a subscription area can be referred to as a 'subscriber device.' Also, a device for transmitting a V2X message to a server can be referred to as a 'publisher device.' A UE can be a subscriber device, a provider device, or both a subscriber device and a provider device. The server can forward V2X messages transmitted by provider devices in a management area to the subscriber device.

The server can deliver a V2X message of the provider device 'associated' with a subscription area of the subscriber device to the subscriber device. The provider device associated with the subscription area of the subscriber device can be referred to as a 'subscribed provider device.' The provider device associated with the subscription area of the subscriber device can satisfy at least one of the following conditions (i) to (iii). (i) Some or all of the publishing area of the provider device overlaps the subscription area of the subscriber device. (ii) Some or all of the subscription area of the provider device overlap the subscription area of the subscriber device. (iii) A location where the provider device transmits the V2X message is within the subscription area of the subscriber device.

According to the condition (i) or (iii), the server delivers a V2X message received within the first subscription area to the first UE 310. The server delivers a V2X message received in the second subscription area to the second UE 320.

Since the first UE 310 is located in the second subscription area, the server can forward the first V2X message to the second UE 320. The second UE 320 is a subscriber device, and the first UE 310 becomes a subscribed provider device.

Since the second UE 320 is not located in the first subscription area (which means that the condition (i) or the condition (iii) is not satisfied), the server does not forward the second V2X message to the first UE 310. The second UE 320 is not a provider device of the first UE 310. If the condition (ii) is considered, the second UE 320 can be a provider device of the first UE 310.

Figure 4:
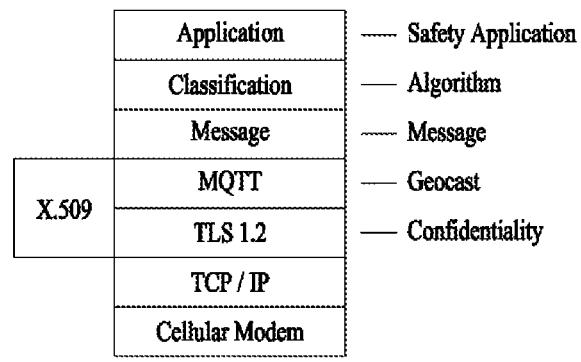
FIG. 4 is a diagram illustrating a Soft Vehicle to Everything (V2X) protocol stack.

Next, FIG. 4 is a diagram showing a Soft V2X protocol stack operable in a UE, a smartphone, etc. Each layer of the Soft V2X protocol stack will be described with reference to FIG. 4. Here, Soft V2X is one V2X communication method in which a method described below is used, and the following description is not limited to the term Soft V2X. In addition, other terms referring to a communication method corresponding to the following description can also be considered as corresponding to Soft V2X in the present disclosure.

Cellular Modem is a modem that uses cellular networks. A cellular network is a communication network configured and operated by dividing an area into several cells, where a cell means a divided area including a single base station. Cellular network communication technology can include 5G New RAT (NR), Long Term Evolution (LTE), and the like. In Soft V2X, unicast communication is performed unlike in the case of V2X. In Soft V2X protocol, a network/transport layer uses IP/TCP used for cellular networks.

Transport Layer Security (TLS) layer is intended to ensure confidentiality using transport layer security, and an authentication certificate uses X.509, a Public Key-based (PKI) ITU-T standard. In addition, Soft V2X protocol is configured to perform the geocast function of sending messages only to users in a specific area. To this end, MQTT, which is an issue-subscription-based messaging protocol, is used.

Subsequently, Soft V2X uses the message defined in SAE J2735 (BSM, PSM, RSA, etc.). SAE J2735 defines signal specifications such as messages, data frames, element formats, structures and the like for V2V/V2I communication, and the main messages are shown in Table 2 below.

TABLE 2

| Main Messages | Use range | Contents |
| --- | --- | --- |
| BSM (Basic Safety Message) | V2V | Provides overall safety-related information. Broadcasting communications with periodicity of 100 ms |
| PVD (Probe Vehicle Data) | V2I | Delivers Probe data' collected on a vehicle to RSU |
| MapData | I2V | Provides information on intersections and road topographic data |
| SPaT (SinglePhaseAndTiming) | I2V | Used in conjunction with MapData to provide information on signal phase and time synchronization of movement at the intersection |
| RTCMCorrections (Real-Time Differential Correction Maritime) | I2V | Message to provide RTCM correction information |
| PSM (PersonalSafetyMessage) | V2P | Provides information about pedestrians in danger range |
| PDM (ProveDataManagement) | I2V | Message for managing PVD messages |
| RSA (RoadSideAlert) | V2X | Supports generation of ad-hoc message from public safety vehicle and RSU |
| SSM (SignalStatusMessage) | I2V | Used for response to Facility Operational Status Request |
| SRM (SignalRequestMessage) | V2I | Message for vehicle entering intersection to obtain service information from signal controller. |
| TIM (TravelerInformationMessage) | I2V | Message that convey information on various traffic information, unexpected situations, pre-road work, etc. |
| CSR (CommonSafetyRequest) | V2V | Request message for data support for safety information exchange |
| EVA (EmergencyVehicleAlert) | V2X | Deliver information about emergency vehicle |
| ICA (IntersectionVehicleAlert) | V2X | Deliver information about vehicle hazard conditions near intersections |
| NMEACorrections | I2V | Used for transmitting message of initial GPS data format on DSRC channel |
| testMessages00-15 | N/A | Used in customized message format for each use region |
| Not Assigned | N/A | Assigned when adding new message content |

Subsequently, a classification layer can generate data necessary for risk assessment based on algorithms. An application layer can determine whether there is risk based on the data that uploaded by the classification layer and notify pedestrians and drivers who own smartphones of the risk.

Figure 5:
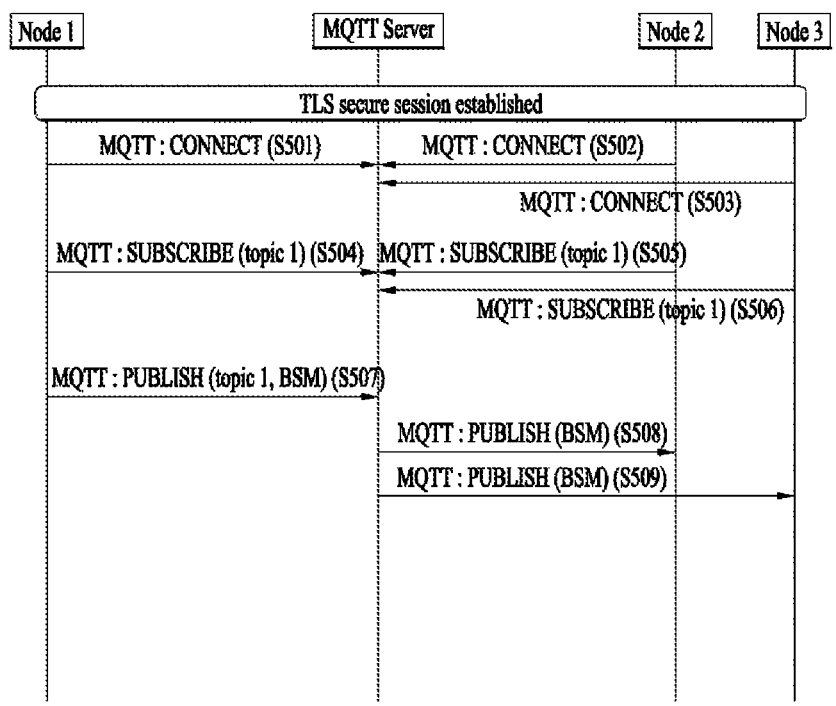
FIG. 5 is a flowchart illustrating an example of performing geocast using Message Queuing Telemetry Transport (MQTT) in Soft V2X.

FIG. 5 is a flowchart illustrating an example of geocast based on MQTT in Soft V2X. In legacy V2X with broadcast communication, devices in the same region can naturally receive messages (BSM, etc.) over broadcast channels. However, considering that the cellular network uses unicast communication, Soft V2X can perform unicast transmission to all devices in the same region based on MQTT, thereby obtaining broadcast-like effects.

For MQTT communication, a secure session needs to be first established between each node and a server based on TLS. Each node can first perform a CONNECT process and then perform a SUBSCRIBE process on a specific topic (S501 to S503 of FIG. 5). In this instance, different topics can be selected depending on regions. A map can be divided into tiles, and the same topic value can be given to each tile. Therefore, each node can perform the SUBSCRIBE process by selecting a topic according to the tile in which the corresponding node is located. For example, in FIG. 5, Nodes 1, 2, and 3 are all present in the same tile (region) and subscribe to the same topic 1 (S504 to S506 in FIG. 5).

When Node 1 transmits a PUBLISH (BSM) to an MQTT server (S507), the server can forward the PUBLISH (BSM) to all nodes having subscribed to topic 1 (S508 and S509). Each Node 2 and Node 3 can perform classification and threat assessment based on the received BSM. If detecting a risk, the corresponding node can inform smartphone users (e.g., pedestrian and driver) of the risk. A vehicle transmits a BSM, and a pedestrian transmits a PSM. These messages can contain information (e.g., ID, location, speed, acceleration, direction, etc.) necessary for risk detection.

All Soft V2X users can use LTE/5G modems to exchange messages with a server through unicast transmission. The server can select information on adjacent users for each user (divided by tiles) and transmit a message to each user. Upon receiving the message, the user can determine whether there is risk of collision. However, when a device is unable to use the LTE/5G modems or communicate with the server, the device cannot use Soft V2X applications, and as a result the service area thereof can be limited.

Accordingly, embodiments of the present disclosure provide a method and apparatus for expanding a Soft V2X service area through communication with adjacent Soft V2X applications based on Bluetooth Low Energy (BLE) and broadcast technology in the above situation. A UE supporting Soft V2X related to BLE according to an embodiment can include a receiver configured to receive either a message transmitted by an MQTT server or a BLE-related broadcast message; and a controller including a message broker configured to determine one of a transmission and reception scheme based on the MQTT server and a BLE-based transmission and reception scheme.

In this instance, the message broker can perform filtering on a broadcast message based on a comparison between the operation mode of the UE and the operation mode of a UE that transmits the broadcast message. Regarding the filtering, if the operation mode of the UE that transmits the broadcast message includes an indication of a hazard to the operation mode of the UE, the broadcast message can be delivered to a message layer. The operation mode can be any one of a pedestrian, a vehicle, and a personal mobility vehicle (PMV). The PMV can refer to a bicycle, a motorcycle, a kickboard scooter, or a personal mobility device similar to the kickboard scooter. Alternatively, the operation mode can include a person, a child, a vehicle, a school bus, a bicycle, a motorcycle, a kickboard scooter, a dangerous area, an Internet of Things (IOT) device, and the like, and the operation mode can be further subdivided. The operation mode of the UE transmitting the broadcast message being dangerous to the operation mode of the UE can include a combination of various operation modes.

For example, for the following priorities: vehicle, PMV, and pedestrian, a higher-priority operating mode can become a hazard to a lower-priority operating mode. For vehicles and PMVs, the vehicles and PMVs can be dangerous to each other even with the same priority, however, the pedestrians are not dangerous to each other with the same priority. For example, there may be no warning between pedestrians. In other words, according to this function, the UE can process a message from a UE in a mode in which warnings can occur with respect to its own mode. Unlike MQTT, the above-described filtering may not be performed in the case of broadcasting based on BLE, and the load of the message broker can be reduced.

Figure 6:
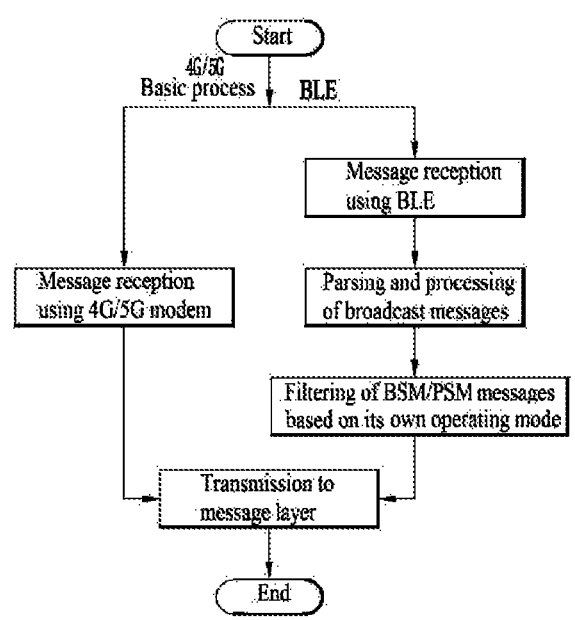

Next, FIG. 6 illustrates a flowchart related to the above-described embodiment. As described above, when the UE receives a broadcast message through BLE, the UE can parse the message, filter a BSM/PSM according to the operation mode of the UE, and then forward the message to the message layer.

The UE can identify that the broadcast message is a BLE-related broadcast message for Soft V2X through a universally unique identifier (UUID) included in an Adv-Data field included in the payload of the broadcast message. The UUID can be preconfigured only for Soft V2X. When it is identified through the UUID that the broadcast message is the BLE-related broadcast message for Soft V2X, the UE can forward the message to the message broker after parsing the message.

Figure 7:
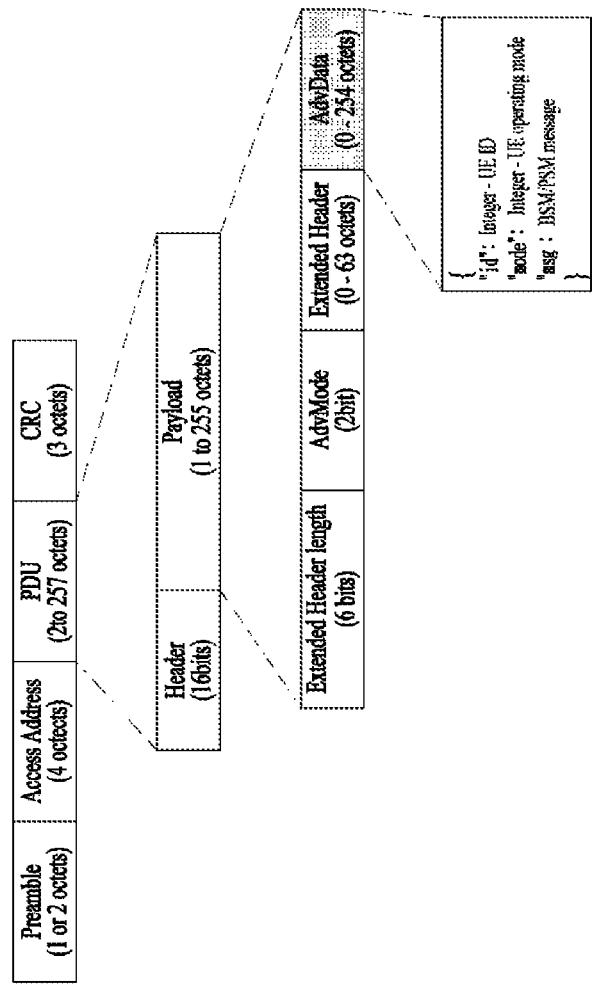

FIG. 7 illustrates an exemplary broadcast message format (A modified BLE packet structure). A PSM and BSM used in Soft V2X can be transmitted using BLE in less than 100 bytes, and the size of a broadcast message can be up to 254 octets. The AdvData field can be modified to include the operation mode of the UE and a PSM/BSM. As described above, a UUID dedicated to Soft V2X can be defined and used to identify a broadcast message only for Soft V2X. Accordingly, only necessary messages can be filtered with Soft V2X UUIDs. In addition, to identify a UE, a BLE broadcast message can include a unique UE ID, a UE operation mode, and a PSM/BSM in the format of JavaScript Object Notation (JSON). An AdvMode field is set to scannable so that the AdvMode field can be scanned during reception. This function can be processed by a device-to-device (D2D) protocol of a protocol stack.

Next, FIG. 8 illustrates an example of a Soft V2X protocol stack for implementing an embodiment. The non-shaded part is an existing protocol stack, and the shaded part is a stack added for the present disclosure. The Soft V2X protocol stack can have a structure capable of supporting BLE while having compatibility with the existing stack. The functions of the newly added stack are as follows.

The message broker can transmit a message generated by the message layer to 4G/5G modems and/or BLE, depending on message transmission and reception schemes. In addition, the message broker can forward messages received from each component to the message layer.

The D2D protocol can add a field that can be identified only in Soft V2X to generate and decode a BLE Advertise message. BLE of Bluetooth (BT) can be used for BLE. Messages can be exchanged by broadcasting and scanning.

The message broker can determine a transmission and reception scheme based on a user input. Regarding the transmission and reception scheme, for a smartphone, a message can be transmitted using 4G/5G modems and/or BLE. When any IOT devices or 4G/5G modems are unavailable, only BLE can be used to transmit messages. The user input can be for a message transmission and reception scheme in a Soft V2X application. That is, for a smartphone, the user can select both 4G/5G modems and BLE or select only one to transmit a message.

Alternatively, the message broker can determine the transmission and reception scheme based on the remaining battery capacity. The message broker can determine the transmission and reception scheme as the BLE-based transmission and reception scheme if the remaining battery capacity is less than or equal to a predetermined threshold. In other words, depending on the remaining battery capacity, the message transmission and reception scheme can be changed. One or two battery specific values (thresholds) can be applied. When one threshold is used, if the battery is above a specific value, the UE can transmit messages in the dual mode. If the battery is below the specific value, the UE can transmit messages using only BLE.

When two thresholds are used, if the battery is greater than or equal to a first specific value, the UE can operate in the dual mode. If the battery is between the first specific value and a second specific value, the UE can use 4G/5G modems. If the battery is less than or equal to the second specific value, the UE can use BLE. As another example, in BLE communication, the UE can operate either in broadcast-only mode or in scan-only mode so as to perform either message transmission or message reception, depending on the usage purpose of the UE (for example, an IoT UE can be configured to broadcast a message notifying the occurrence of an accident).

The functions described above can be performed by the message broker in the protocol stack, and messages can be transmitted using the 4G/5G modems and/or BLE according to the determination.

Figure 9:
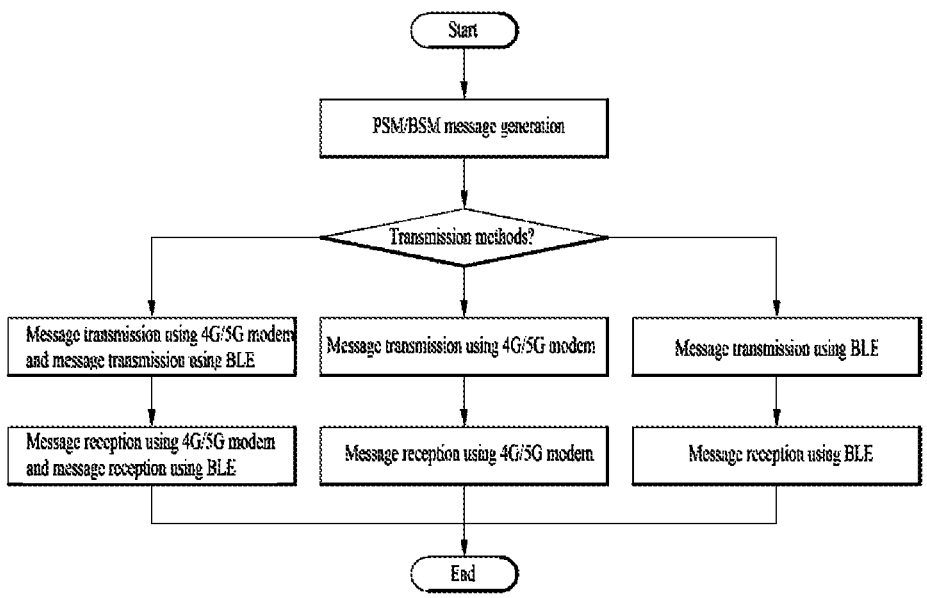

Next, FIG. 9 illustrates a flowchart related to the determination of the message transmission and reception scheme described above. In addition to the above-mentioned embodiments, the received signal strength of 4G/5G modems, the number of UEs using BLE, the moving speed of a user, and the processing capacity of the UE can be included. In particular, FIG. 9 illustrates the PSM/BSM message generation and the transmission methods choices including message transmission and reception using 4G/5G modem and using BLE, message transmission and reception using 4G/5G modem, and message transmission and reception using BLE.

Figure 10:
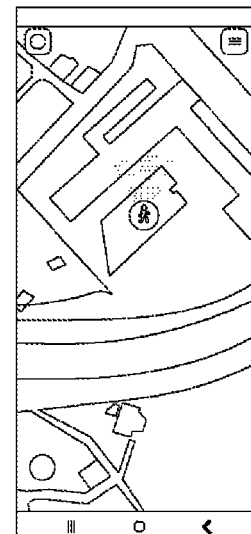

FIG. 10 shows an example of determination based on a user input regarding the determination of the message transmission and reception scheme described above. As shown in FIG. 10(*a*), a user interface (UI) for selecting a message transmission and reception scheme can be displayed on the screen of the UE. In this instance, if "Modem and BLE" or "BLE" is selected, an UI for the BLE transmission and reception scheme can be displayed as shown in FIG. 10(*b*). Then, "TX," "RX," "TX and RX" can be selected. When there is a user input as described above, the current message transmission and reception scheme can be provided to the user by a color and a person shape (in this instance, it is assumed that the mode is a pedestrian). For example, if the message transmission and reception scheme is "Modem only," blue can be displayed on the map. If the transmission and reception scheme is changed, other colors such as yellow or orange or other shapes can be displayed, so that the current message transmission and reception mode can be displayed and identified in a user experience (UX) way.

Figure 11:
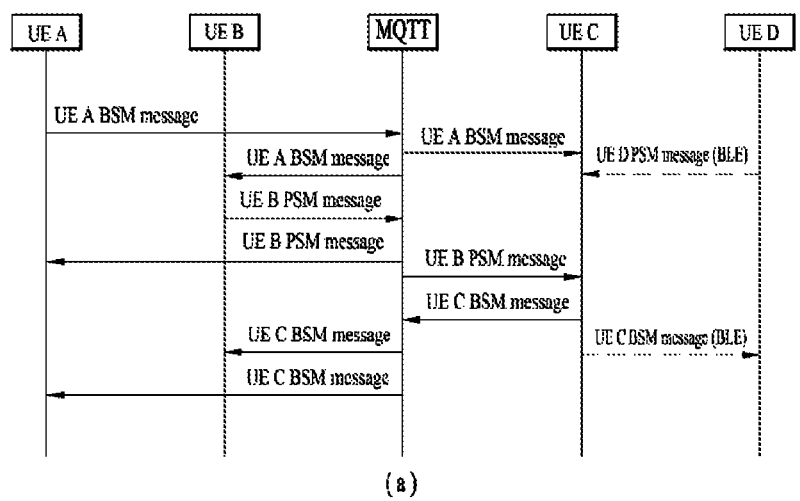
Figure 11:
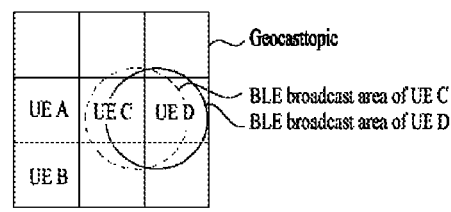
Figure 12:
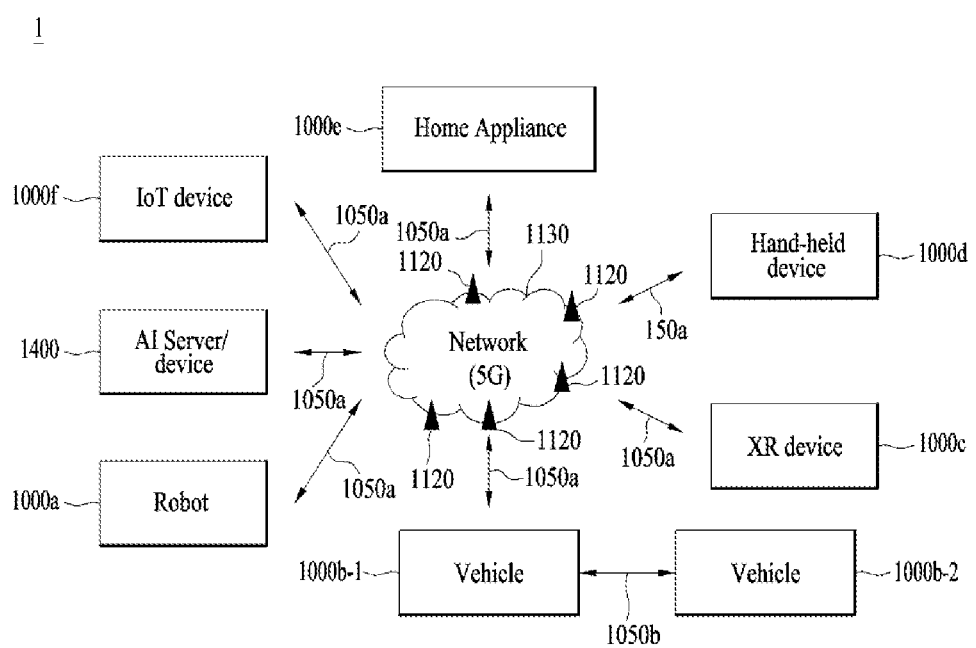

Next, FIG. 11 is a flowchart illustrating message transmission and reception between UEs, and FIG. 12 illustrates the location of each UE. UEs A and B are performing MQTT communication only, UE C is performing both MQTT communication and BLE communication, and UE D is performing BLE communication only.

UEs A, B, and C can be adjacent to each other in a geocast topic and exchange messages from each other based on MQTT. UE C can transmit messages through BLE broadcast in the round area marked in a solid line. UE D can transmit messages through BLE broadcast in the area for BLE communication indicated by a solid line. Only UE C and UE D can exchange messages through BLE.

In relation to the above description, a method of operating a UE supporting Soft V2X related to BLE is provided. The method includes receiving either a message transmitted by an MQTT server or a BLE-related broadcast message; and determining, by a message broker, one of a transmission and reception scheme based on the MQTT server and a BLE-based transmission and reception scheme. For the broadcast message, the message broker can perform filtering based on comparison between the operation mode of the UE and the operation mode of a UE transmitting the broadcast message.

According to the above-described embodiments, as the number of UEs switching to BLE or using BLE increases, the use area can be expanded, thereby ensuring user safety. From the perspective of a user or server, the use of paid data can be reduced as there is no need for communication between the server and UE. In addition, since messages can be delivered to multiple users at the same time based on broadcast communication of BT, delays in message transfer can be reduced, thereby not only securing safety quickly but also reducing battery consumption, compared to unicast. Since messages are continuously broadcast, switching to BLE can also have the effect of reducing the amount of battery consumed, compared to conventional communication methods.

Examples of Communication Systems Applicable to the Present Disclosure

The various descriptions, functions, procedures, proposals, methods, and/or operational flowcharts of the present disclosure described in this document can be applied to, without being limited to, a variety of fields requiring wireless communication/connection (e.g., 5G) between devices.

Hereinafter, a description will be given in more detail with reference to the drawings. In the following drawings/description, the same reference symbols can denote the same or corresponding hardware blocks, software blocks, or functional blocks unless described otherwise.

FIG. 12 illustrates a communication system 1 applied to the present disclosure. Referring to FIG. 12, a communication system 1 applied to the present disclosure includes wireless devices, BSs, and a network. Herein, the wireless devices represent devices performing communication using RAT (e.g., 5G NR or LTE) and can be referred to as communication/radio/5G devices. The wireless devices can include, without being limited to, a robot 1000a, vehicles 1000b-1 and 1000b-2, an extended reality (XR) device 1000c, a hand-held device 100d, a home appliance 1000e, an Internet of things (IoT) device 1000f, and an artificial intelligence (AI) device/server 1400. For example, the vehicles can include a vehicle having a wireless communication function, an autonomous driving vehicle, and a vehicle capable of performing communication between vehicles. Herein, the vehicles can include an unmanned aerial vehicle (UAV) (e.g., a drone). The XR device can include an augmented reality (AR)/virtual reality (VR)/mixed reality (MR) device and can be implemented in the form of a head-mounted device (HMD), a head-up display (HUD) mounted in a vehicle, a television, a smartphone, a computer, a wearable device, a home appliance device, a digital signage, a vehicle, a robot, etc.

The hand-held device can include a smartphone, a smartpad, a wearable device (e.g., a smartwatch or a smartglasses), and a computer (e.g., a notebook). The home appliance can include a TV, a refrigerator, and a washing machine. The IoT device can include a sensor and a smartmeter. For example, the BSs and the network can be implemented as wireless devices and a specific wireless device can operate as a BS/network node with respect to other wireless devices.

The wireless devices 1000a to 1000f can be connected to the network 1130 via the BSs 1120. An AI technology can be applied to the wireless devices 1000a to 1000f and the wireless devices 1000a to 1000f can be connected to the AI server 1400 via the network 1130. The network 1130 can be configured using a 3G network, a 4G (e.g., LTE) network, or a 5G (e.g., NR) network. Although the wireless devices 1000a to 1000f can communicate with each other through the BSs 1120/network 1130, the wireless devices 1000a to 1000f can perform direct communication (e.g., sidelink communication) with each other without passing through the BSs/network. For example, the vehicles 1000b-1 and 1000b-2 can perform direct communication (e.g., V2V/V2X communication). The IoT device (e.g., a sensor) can perform direct communication with other IoT devices (e.g., sensors) or other wireless devices 1000a to 1000f.

Wireless communication/connections 1050a, 1050b, or 1050c can be established between the wireless devices 1000a to 1000f/BS 1120, or BS 1120/BS 1120. Herein, the wireless communication/connections can be established through various RATs (e.g., 5G NR) such as UL/DL communication 1050a, sidelink communication 1050b (or, D2D communication), or inter BS communication (e.g., relay, integrated access backhaul (IAB)). The wireless devices and the BSs/the wireless devices can transmit/receive radio signals to/from each other through the wireless communication/connections 1050a and 1050b. For example, the wireless communication/connections 1050a and 1050b can transmit/receive signals through various physical channels. Thus, at least a part of various configuration information configuring processes, various signal processing processes (e.g., channel encoding/decoding, modulation/demodulation, and resource mapping/demapping), and resource allocating processes, for transmitting/receiving radio signals, can be performed based on the various proposals of the present disclosure.

Figure 13:
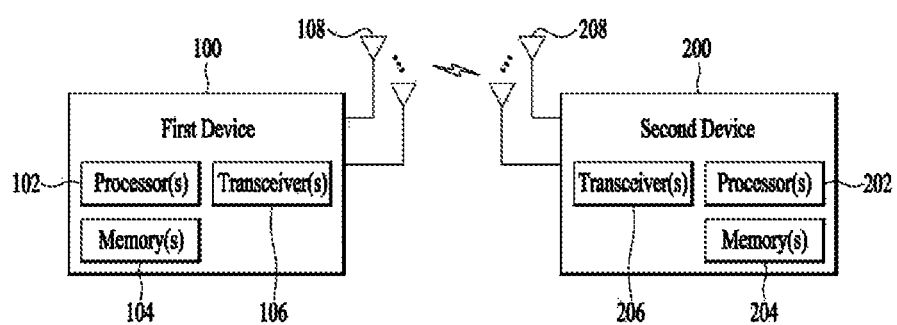

Examples of wireless devices applicable to the present disclosure. FIG. 13 illustrates wireless devices applicable to the present disclosure. Referring to FG. 13, a first wireless device 100 and a second wireless device 200 can transmit radio signals through a variety of RATs (e.g., LTE and NR). Herein, {the first wireless device 100 and the second wireless device 200} can correspond to {the wireless device 100x and the BS 200} and/or {the wireless device 100x and the wireless device 100x} of FIG. 12.

The first wireless device 100 can include one or more processors 102 and one or more memories 104 and additionally further include one or more transceivers 106 and/or one or more antennas 108. The processor(s) 102 can control the memory(s) 104 and/or the transceiver(s) 106 and can be configured to implement the descriptions, functions, procedures, proposals, methods, and/or operational flowcharts disclosed in this document. For example, the processor(s) 102 can process information within the memory(s) 104 to generate first information/signals and then transmit radio signals including the first information/signals through the transceiver(s) 106.

The processor(s) 102 can receive radio signals including second information/signals through the transceiver 106 and then store information obtained by processing the second information/signals in the memory(s) 104. The memory(s) 104 can be connected to the processor(s) 102 and can store a variety of information related to operations of the processor(s) 102. For example, the memory(s) 104 can store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 can be a part of a communication modem/circuit/chip designed to implement RAT (e.g., LTE or NR). The transceiver(s) 106 can be connected to the processor(s) 102 and transmit and/or receive radio signals through one or more antennas 108. Each of the transceiver(s) 106 can include a transmitter and/or a receiver. The transceiver(s) 106 can be interchangeably used with Radio Frequency (RF) unit(s). In the present disclosure, the wireless device can represent a communication modem/circuit/chip.

The second wireless device 200 can include one or more processors 202 and one or more memories 204 and additionally further include one or more transceivers 206 and/or one or more antennas 208. The processor(s) 202 can control the memory(s) 204 and/or the transceiver(s) 206 and can be configured to implement the descriptions, functions, procedures, proposals, methods, and/or operational flowcharts disclosed in this document. For example, the processor(s) 202 can process information within the memory(s) 204 to generate third information/signals and then transmit radio signals including the third information/signals through the transceiver(s) 206.

The processor(s) 202 can receive radio signals including fourth information/signals through the transceiver(s) 206 and then store information obtained by processing the fourth information/signals in the memory(s) 204. The memory(s) 204 can be connected to the processor(s) 202 and can store a variety of information related to operations of the processor(s) 202. For example, the memory(s) 204 can store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 can be a part of a communication modem/circuit/chip designed to implement RAT (e.g., LTE or NR). The transceiver(s) 206 can be connected to the processor(s) 202 and transmit and/or receive radio signals through one or more antennas 208. Each of the transceiver(s) 206 can include a transmitter and/or a receiver. The transceiver(s) 206 can be interchangeably used with RF unit(s). In the present disclosure, the wireless device can represent a communication modem/circuit/chip.

Hereinafter, hardware elements of the wireless devices 100 and 200 will be described more specifically. One or more protocol layers can be implemented by, without being limited to, one or more processors 102 and 202. For example, the one or more processors 102 and 202 can implement one or more layers (e.g., functional layers such as PHY, MAC, RLC, PDCP, RRC, and SDAP). The one or more processors 102 and 202 can generate one or more Protocol Data Units (PDUs) and/or one or more service data unit (SDUs) according to the descriptions, functions, procedures, proposals, methods, and/or operational flowcharts disclosed in this document. The one or more processors 102 and 202 can generate messages, control information, data, or information according to the descriptions, functions, procedures, proposals, methods, and/or operational flowcharts disclosed in this document.

The one or more processors 102 and 202 can generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 can receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 can be referred to as controllers, microcontrollers, microprocessors, or microcomputers. The one or more processors 102 and 202 can be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) can be included in the one or more processors 102 and 202. The descriptions, functions, procedures, proposals, methods, and/or operational flowcharts disclosed in this document can be implemented using firmware or software and the firmware or software can be configured to include the modules, procedures, or functions. Firmware or software configured to perform the descriptions, functions, procedures, proposals, methods, and/or operational flowcharts disclosed in this document can be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document can be implemented using firmware or software in the form of code, commands, and/or a set of commands.

The one or more memories 104 and 204 can be connected to the one or more processors 102 and 202 and store various types of data, signals, messages, information, programs, code, instructions, and/or commands. The one or more memories 104 and 204 can be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 can be located at the interior and/or exterior of the one or more processors 102 and 202. The one or more memories 104 and 204 can be connected to the one or more processors 102 and 202 through various technologies such as wired or wireless connection.

The one or more transceivers 106 and 206 can transmit user data, control information, and/or radio signals/channels, mentioned in the methods and/or operational flowcharts of this document, to one or more other devices. The one or more transceivers 106 and 206 can receive user data, control information, and/or radio signals/channels, mentioned in the descriptions, functions, procedures, proposals, methods, and/or operational flowcharts disclosed in this document, from one or more other devices. For example, the one or more transceivers 106 and 206 can be connected to the one or more processors 102 and 202 and transmit and receive radio signals. For example, the one or more processors 102 and 202 can perform control so that the one or more transceivers 106 and 206 can transmit user data, control information, or radio signals to one or more other devices. The one or more processors 102 and 202 can perform control so that the one or more transceivers 106 and 206 can receive user data, control information, or radio signals from one or more other devices. The one or more transceivers 106 and 206 can be connected to the one or more antennas 108 and 208 and the one or more transceivers 106 and 206 can be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas can be a plurality of physical antennas or a plurality of logical antennas (e.g., antenna ports).

The one or more transceivers 106 and 206 can convert received radio signals/channels etc. from RF band signals into baseband signals to process received user data, control information, radio signals/channels, etc. using the one or more processors 102 and 202. The one or more transceivers 106 and 206 can convert the user data, control information, radio signals/channels, etc. processed using the one or more processors 102 and 202 from the base band signals into the RF band signals. To this end, the one or more transceivers 106 and 206 can include (analog) oscillators and/or filters.

Figure 14:
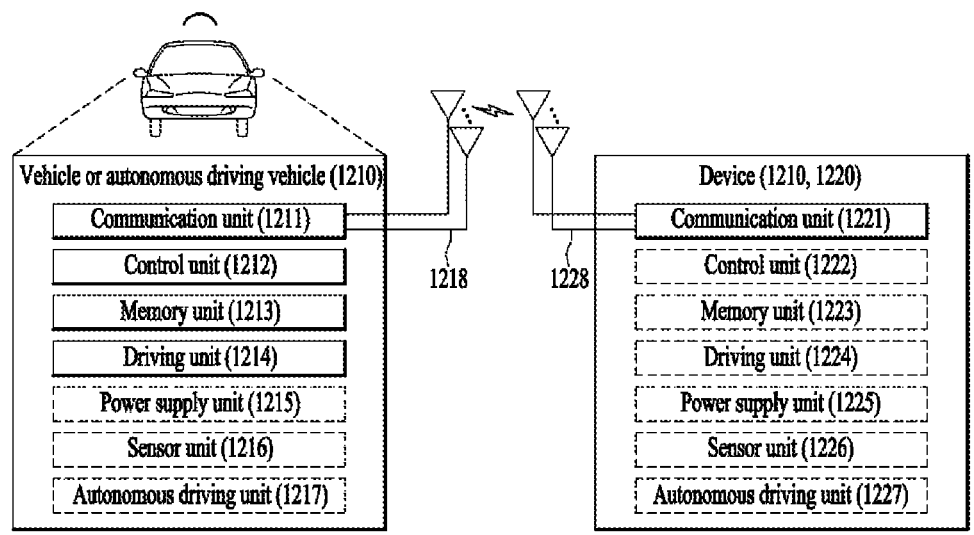

Examples of a vehicle or an autonomous driving vehicle applicable to the present disclosure. In particular, FIG. 14 illustrates a vehicle or an autonomous driving vehicle applied to the present disclosure. The vehicle or autonomous driving vehicle can be implemented by a mobile robot, a car, a train, a manned/unmanned aerial vehicle (AV), a ship, etc.

Referring to FIG. 14, a vehicle or autonomous driving vehicle 1210 can include an antenna unit 1218, a communication unit 1211, a control unit 1212, a memory unit 1213, a driving unit 1214, a power supply unit 1215, a sensor unit 1216, and an autonomous driving unit 1217. The antenna unit 1218 can be configured as a part of the communication unit 1211.

The communication unit 1211 can transmit and receive signals (e.g., data and control signals) to and from external devices such as other vehicles, BSs (e.g., gNBs and road side units), and servers. The control unit 1212 can perform various operations by controlling elements of the vehicle or the autonomous driving vehicle 1210. The control unit 1212 can include an ECU. The driving unit 1214 can cause the vehicle or the autonomous driving vehicle 1210 to drive on a road.

The driving unit 1214 can include an engine, a motor, a powertrain, a wheel, a brake, a steering device, etc. The power supply unit 1215 can supply power to the vehicle or the autonomous driving vehicle 1210 and include a wired/wireless charging circuit, a battery, etc. The sensor unit 1216 can acquire a vehicle state, ambient environment information, user information, etc. The sensor unit 1216 can include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 1217 can implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 1211 can receive map data, traffic information data, etc. from an external server. The autonomous driving unit 1217 can generate an autonomous driving path and a driving plan from the obtained data. The control unit 1212 can control the driving unit 1214 such that the vehicle or the autonomous driving vehicle 1210 can move along the autonomous driving path according to the driving plan (e.g., speed/direction control).

In the middle of autonomous driving, the communication unit 1211 can aperiodically/periodically acquire recent traffic information data from the external server and acquire surrounding traffic information data from neighboring vehicles. In the middle of autonomous driving, the sensor unit 1216 can obtain a vehicle state and/or surrounding environment information. The autonomous driving unit 1214 can update the autonomous driving path and the driving plan based on the newly obtained data/information. The communication unit 1211 can transfer information about a vehicle position, the autonomous driving path, and/or the driving plan to the external server. The external server can predict traffic information data using AI technology, etc., based on the information collected from vehicles or autonomous driving vehicles and provide the predicted traffic information data to the vehicles or the autonomous driving vehicles.

For example, FIG. 14 illustrate a neighboring vehicle 1210 or device 1220. As shown, the neighboring vehicle 1210 or device 1220 also includes an antenna unit 1228, a communication unit 1221, a control unit 1222, a memory unit 1223, a driving unit 1224, a power supply unit 1225, a sensor unit 1226, and an autonomous driving unit 1227. The antenna unit 1228 can be configured as a part of the communication unit 1221.

Examples of a vehicle and AR/VR applicable to the present disclosure. In particular, FIG. 15 illustrates a vehicle applied to the present disclosure. The vehicle can be implemented as a transport means, an aerial vehicle, a ship, etc. Referring to FIG. 15, a vehicle 1310 can include a communication unit 1311, a control unit 1312, a memory unit 1313, an I/O unit 1314, and a positioning unit 1315.

The communication unit 1311 can transmit and receive signals (e.g., data and control signals) to and from external devices such as other vehicles or BSs. The control unit 1312 can perform various operations by controlling constituent elements of the vehicle 1310. The memory unit 1313 can store data/parameters/programs/code/commands for supporting various functions of the vehicle 1310. The I/O unit 1314 can output an AR/VR object based on information within the memory unit 1313.

The I/O unit 1314 can include an HUD. The positioning unit 1315 can acquire information about the position of the vehicle 1310. The position information can include information about an absolute position of the vehicle 1310, information about the position of the vehicle 1310 within a traveling lane, acceleration information, and information about the position of the vehicle 1310 from a neighboring vehicle. The positioning unit 1315 can include a GPS and various sensors.

As an example, the communication unit 1311 of the vehicle 1310 can receive map information and traffic information from an external server and store the received information in the memory unit 1313. The positioning unit 1315 can obtain the vehicle position information through the GPS and various sensors and store the obtained information in the memory unit 1313. The control unit 1312 can generate a virtual object based on the map information, traffic information, and vehicle position information and the I/O unit 1314 can display the generated virtual object 1410 in a window 1420 in the vehicle. The control unit 1312 can determine whether the vehicle 1310 normally drives within a traveling lane, based on the vehicle position information. If the vehicle 1310 abnormally exits from the traveling lane, the control unit 1312 can display a warning on the window in the vehicle through the I/O unit 1314. In addition, the control unit 1312 can broadcast a warning message regarding driving abnormity to neighboring vehicles through the communication unit 1311. According to situation, the control unit 1312 can transmit the vehicle position information and the information about driving/vehicle abnormality to related organizations.

As is apparent from the above description, the present disclosure has the following advantages.

According to embodiment(s), the use area of Soft Vehicle to Everything (V2X) can be expanded, thereby increasing user safety. Battery consumption can be reduced by turning off LTE/5G modems and switching to Bluetooth (BT). The use of paid data can be reduced from the perspective of a user, and the data usage of a server can be reduced from the perspective of the server. Compared to unicast transmission, safety-related messages can be quickly delivered to multiple users based on broadcast communication of BT, thereby ensuring user safety.

It will be apparent to those skilled in the art that various modifications and variations can be made in the present disclosure without departing from the spirit and scope of the disclosure. Thus, it is intended that the present disclosure cover the modifications and variations of this disclosure provided they come within the scope of the appended claims and their equivalents.

What is claimed is:

1. A user equipment (UE) comprising:
    a receiver configured to receive a message corresponding to a Soft Vehicle to Everything (V2X) message transmitted by a Message Queuing Telemetry Transport (MQTT) server using MQTT communication or a Soft V2X Bluetooth Low Energy (BLE)-related broadcast message transmitted by another UE using BLE communication; and
    a controller including a message broker configured to:
    determine whether the received message is the Soft V2X BLE-related broadcast message or the Soft V2X message transmitted by the MQTT server based on identification information included in a payload of the received message,
    in response to the received message being determined as the Soft V2X BLE-related broadcast message, perform filtering on the received message based on a comparison between an operation mode of the UE and an operation mode of the other UE, and
    in response the received message being determined as the Soft V2X message transmitted by the MQTT server, process the received message without the filtering.

2. The UE of claim 1, wherein the controller is further configured to:
    determine the operation mode of the other UE is hazardous to the operation mode of the UE, and
    deliver the filtered message to a message layer of the UE.

3. The UE of claim 2, wherein the operation mode includes any one of a pedestrian, a vehicle, and a personal mobility vehicle (PMV).

4. The UE of claim 1, wherein the controller is further configured to determine the received message is the Soft V2X BLE-related broadcast message through a universally unique identifier (UUID) in an AdvData field included in the payload of the received message.

5. The UE of claim 4, wherein the UUID is preconfigured only for Soft V2X.

6. The UE of claim 4, wherein the controller is further configured to:
    in response to the received message being determined as the Soft V2X BLE-related broadcast message, perform parsing on the received message before performing the filtering.

7. The UE of claim 4, wherein the AdvData field further includes the operation mode of the UE and a personal safety message/basic safety message (PSM/BSM).

8. The UE of claim 1, wherein the message broker is configured to determine a transmission and reception scheme for transmitting Soft V2X messages via the BLE communication or via the MQTT communication.

9. The UE of claim 8, wherein message broker is further configured to determine the transmission and reception scheme based on a user input.

10. The UE of claim 8, wherein the message broker is further configured to determine the transmission and reception scheme based on a remaining battery capacity of the UE.

11. The UE of claim 10, wherein based on the remaining battery capacity being less than or equal to a predetermined threshold, the message broker is configured to determine the transmission and reception scheme as using the BLE communication.

12. The UE of claim 10, wherein based on the remaining battery capacity being greater than or equal to a first predetermined threshold, the message broker is configured to determine the transmission and reception scheme as using a dual communication mode including the MQTT communication and the BLE communication,
    wherein based on the remaining battery capacity being less than the first predetermined threshold and greater than or equal to a second predetermined threshold less than the first predetermined threshold, the message broker is configured to determine the transmission and reception scheme as using the MQTT communication, and
    wherein based on the remaining battery capacity being less than the second predetermined threshold, the message broker is configured to determine the transmission and reception scheme as using the BLE communication.

13. A method of controlling a user equipment (UE), the method comprising:
    receiving, a receiver of the UE, a message corresponding to a Soft Vehicle to Everything (V2X) message transmitted by a Message Queuing Telemetry Transport (MQTT) server using MQTT communication or a Soft V2X Bluetooth Low Energy (BLE)-related broadcast message transmitted by another UE using BLE communication;
    determining, via a controller of the UE, whether the received message is the Soft V2X BLE-related broadcast message or the Soft V2X message transmitted by the MQTT server based on identification information included in a payload of the received message;
    in response to the received message being determined as the Soft V2X BLE-related broadcast message, performing, via the controller, filtering on the received message based on a comparison between an operation mode of the UE and an operation mode of the other UE; and in response the received message being determined as the Soft V2X message transmitted by the MQTT server, processing, via the controller, the received message without the filtering.

14. The method of claim 13, further comprising:
determining the operation mode of the other UE is hazardous to the operation mode of the UE; and
delivering the filtered message to a message layer of the UE.

15. The method of claim 14, wherein the operation mode includes any one of a pedestrian, a vehicle, and a personal mobility vehicle (PMV).

16. The method of claim 13, further comprising:
determining the received message is the Soft V2X BLE-related broadcast message through a universally unique identifier (UUID) in an AdvData field included in the payload of the received message.

17. The method of claim 16, wherein the AdvData field further includes the operation mode of the UE and a personal safety message/basic safety message (PSM/BSM).

18. The method of claim 13, further comprising:
determining, via a message broker of the controller, a transmission and reception scheme for transmitting Soft V2X messages via the BLE communication or via the MQTT communication based on a user input or a remaining battery capacity of the UE.

19. The method of claim 18, wherein based on the remaining battery capacity being less than or equal to a predetermined threshold, the message broker determines the transmission and reception scheme as using the BLE communication.

20. The method of claim 18, wherein based on the remaining battery capacity being greater than or equal to a first predetermined threshold, the message broker determines the transmission and reception scheme as using a dual communication mode including the MQTT communication and the BLE communication,
wherein based on the remaining battery capacity being less than the first predetermined threshold and greater than or equal to a second predetermined threshold less than the first predetermined threshold, the message broker determines the transmission and reception scheme as using the MQTT communication, and
wherein based on the remaining battery capacity being less than the second predetermined threshold, the message broker determines the transmission and reception scheme as using the BLE communication.

* * * * *